United States Patent
Bovati

[11] 3,760,537
[45] Sept. 25, 1973

[54] DEVICE FOR SMOOTHING THE SURFACE OF TURNED WOOD ELEMENTS

[75] Inventor: Costantino Bovati, Bergamo, Italy

[73] Assignee: Officine Meccaniche Di Alme'S.p.A., Bergamo, Italy

[22] Filed: Mar. 25, 1970

[21] Appl. No.: 24,042

[30] Foreign Application Priority Data
Mar. 31, 1969 Italy .................... 1323 A/69

[52] U.S. Cl. .................... 51/145 R, 51/147
[51] Int. Cl. .................... B24b 21/02
[58] Field of Search .................... 51/135 R, 137, 142, 51/145 R, 147

[56] References Cited
UNITED STATES PATENTS
2,589,017  3/1952  Moore .................... 51/147 X FOREIGN PATENTS OR APPLICATIONS
447,589  3/1948  Canada .................... 51/147

*Primary Examiner*—Donald G. Kelly
*Attorney*—Richard P. Alberi

[57] ABSTRACT

Device applicable to the carriage of lathes provided with copying template, the device comprising rollers which are rotated by a motor and on which two looped tapes are wound up, the outward facing surface thereof being coated with abrasive material. The rollers are mounted on two rocking arms, the rocking movement of which is controlled by extensions fast with said arms and engaging the shaped profile of the lathe template as the carriage moves. Two pairs of the rollers are positioned at the surface of a wood piece mounted on the lathe. This wood piece is turned by tools mounted on the carriage and controlled by the template and just after turning is rough-shaped and smoothed by the tapes.

3 Claims, 3 Drawing Figures

DEVICE FOR SMOOTHING THE SURFACE OF TURNED WOOD ELEMENTS

This invention relates to a device for smoothing the surface of turned wood elements, and more particularly to a device of the above type applicable to the carriage of a lathe provided with a copying template.

As known, the wood industry makes a very large use of turned wood pieces or elements which are like one another and provided on lathes by tools, the position of which relative to the axis of rotation for the wood pieces on the lathe is controlled by copying templates. It is also known that the turned wood pieces or elements have scorings on the surface thereof, requiring a subsequent smoothing operation of said surfaces.

In many cases this smoothing operation is carried out manually, or by properly designed smoothing machines. The use of smoothing machines makes the smoothing process rather expensive, both for the cost of the machines and because the wood pieces being removed from the lathe are to be next mounted and correctly positioned on the smoothing machine for the required finishing operation of the surfaces of the wood pieces. Thus, turning and smoothing are carried out in two distinct and subsequent steps, which requires also the contribution of highly skilled personnel and quite often leads to deterioration of turned wood pieces and this because of shocks the wood pieces may be subjected to following the turning process at the storing step, or when passing directly from the lathe to the smoothing machine, or because of uncorrect positioning on the smoothing machine.

Therefore, the main object of the present invention is to provide a device which is directly applicable to the carriage of a lathe and for smoothing the surface of a wood piece just after said surface has been turned.

Another object is to provide a device for smoothing the surface of turned wood pieces, which device is of a simple and economical structure and reliable in use.

These and other objects are attained by a device applicable to the carriage of a lathe provided with a copying template, this device being characterized by comprising a base attachable to the carriage of a lathe, a motor mounted on said base and having an elongated projecting shaft on which at least two rollers are keyed, at least a first and a second arm rocking independently of each other and freely rotably mounted about the axis of said motor shaft, at least a first and a second pair of shaped pressure rollers juxtaposed to each other and and freely rotably mounted on pins carried by a first plate secured to said first rocking arm and, respectively, carried by a second plate secured to said second rocking arm, at least one rod projecting from said first rocking arm and carrying at least two rollers freely rotable on said rod, at least two looped tapes having the outward facing surface thereof coated with abrasive material, one of these tapes being slidably mounted on said pair of pressure rollers carried by said first plate, on one roller of said shaft and one roller of said rod, respectively, and the other tape being also slidably mounted on said pair of pressure rollers carried by said second plate, on the other roller of said shaft and the other roller of said rod, respectively, each of said first and second arms having an extension extending towards said template fast with the lathe frame and abutting on the shaped profile of the template.

For a better understanding of the device structure and features, an embodiment thereof will now be described by mere way of not limiting example, reference being had to the accompanying drawings, in which.

Figure 1:
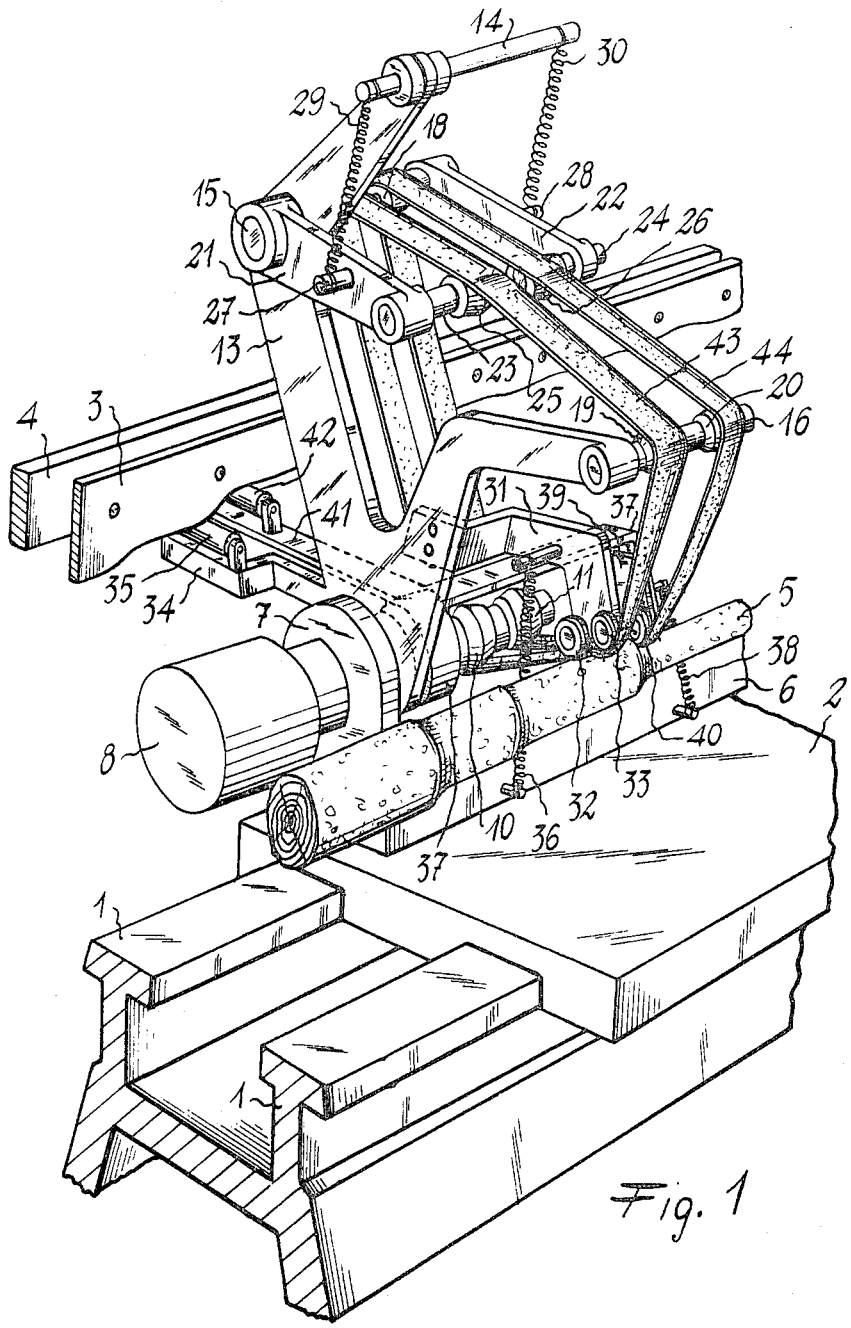
FIG. 1 is a perspective view of the device as mounted on the carriage of a lathe, only one portion of this lathe being shown in the drawing.

In the drawings there is shown a portion of two guides 1 for a lathe (the other portions of the lathe not being shown in the drawings for simplicity and because not essential for understanding the present invention), on which a carriage 2 is slidably mounted in a per se known manner: the lathe also comprises a copying template 3 which is secured by means of bolts to a rigid supporting bar 4 which, in turn, is carried by the lathe frame. FIG. 1 also shows a turned wood piece 5 which is carried and rotated on the lathe spindle and tailstock in a per se well known manner.

Figures 2, 3:
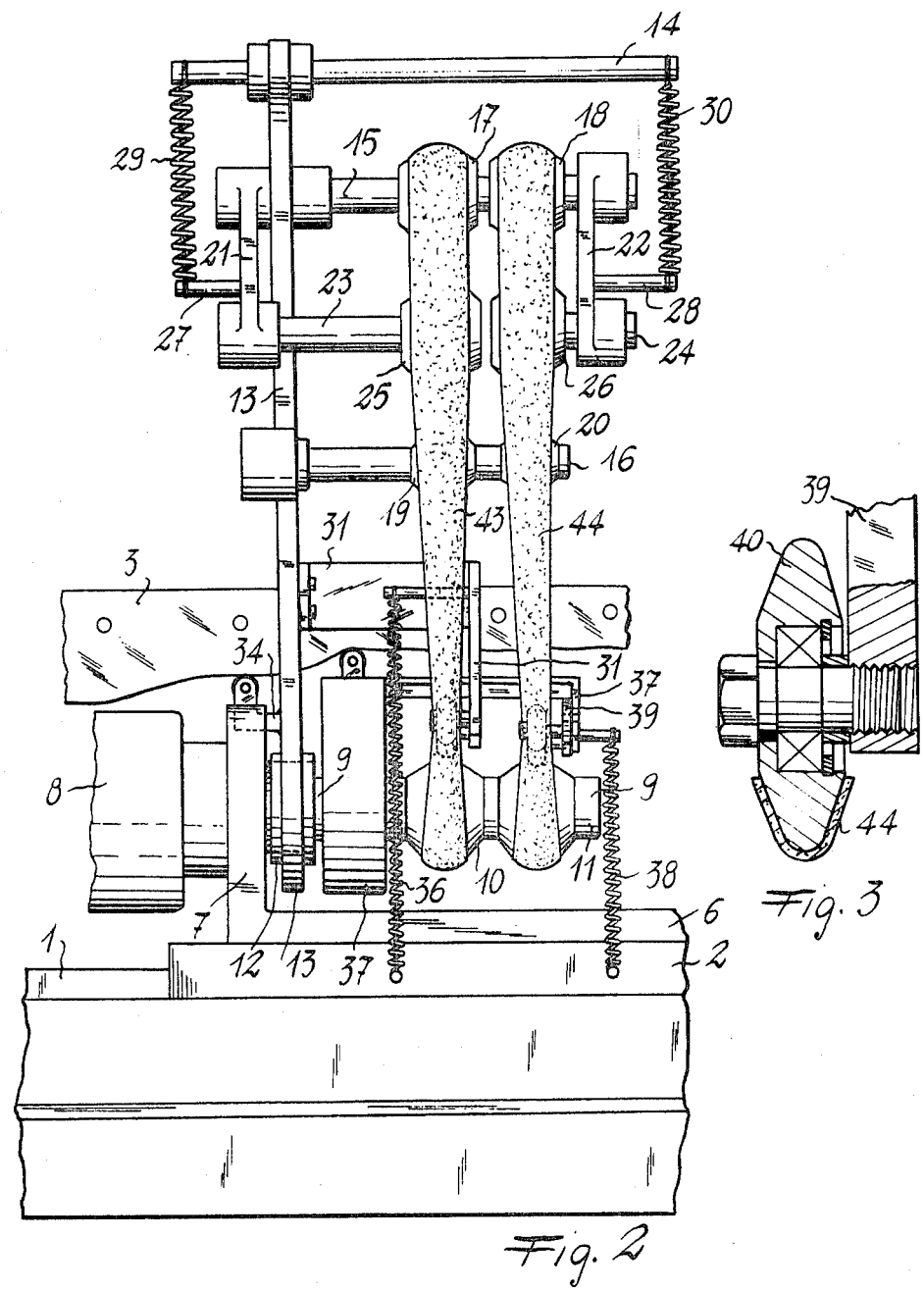
FIG. 2 is a front view of the device in FIG. 1.
FIG. 3 is an enlarged sectional view showing a pressure roller forming part of the device.

By bolts, not shown, a base 6 is secured on the lathe carriage 2, and therefrom a vertical wall 7 projects, to which the casing of an electric motor 8 is secured by bolts, the shaft 9 of this motor extending through a hole in wall 7, as shown in FIGS. 1 and 2. Two rollers, designated by reference numerals 10, 11, respectively, are keyed on shaft 9 and rotated along with shaft 9 when said motor 8 is supplied with electric current. Shaft 9 passes through a length of a tubular body projecting from wall 7, on this length of tubular body there being freely rotably mounted a length of tubular body 12 (FIG. 2), with which a first rocking arm 13 is fast and capable of rotate to a limited extent about the axis of shaft 9. Three rods 14, 15 and 16 are fast with said arm 13, two rollers 17, 18, 19 and 20, respectively, being mounted on each of said rods 15 and 16.

Two levers 21 and 22 are freely rotably mounted at one end thereof on rod 15, at the other end thereof carrying two rods 23 and 24, respectively, on which two rollers 25 and 26 are freely rotably mounted. From each of the levers 21 and 22 a stake 27 and 28, respectively, projects, to which one end of a spring 29 and 30, respectively, is secured, the other end of which is secured to rod 14: the springs are under tension and operate on levers 21 and 22 to upward lift the rollers 25 and 26. In the drawings said springs are shown as being fixedly mounted on rod 14 and stakes 27 and 28, but it is obvious that any per se known type of device for adjusting the spring tension may operate on said springs.

A first plate 31 is secured by bolts to the rocking arm 13 and from this plate 31 two pins project and carry two shaped pressure rollers 32 and 33 which are suitably spaced apart from each other. An extension 34 also projects from said arm 13, extending to template 3 and carrying a rotable roller 35 abutting on the shaped profile of the template, said roller 35 being kept at a pressed condition on the shaped profile of the template by a spring 36 which is under tension and the ends of which are attached to a stake projecting from base 6 and, respectively, to a stake projecting from plate 31.

A rolling bearing (not shown) is mounted on shaft 9, there being mounted on this bearing a second rocking arm 37, from which a stake projects, on the latter there being attached one end of a spring 38, the other end of which is attached to a stake fast with base 6, this spring 38 being under tension. A plate 39 is secured to arm 37 by bolts and has two projecting pins, on which are freely rotably mounted two shaped pressure rollers similar to those designated by reference numerals 32 and 33, the only roller 40 of which is shown in FIG. 1. An extension 41 projects from the rocking arm 37, extending to template 3 and carrying a roller 42 abutting on the shaped profile of the template, against which it is kept at a urged condition because of the action being exerted on arm 37 by spring 38.

Finally, from the drawings it will be seen that the device comprises two looped tapes 43 and 44 winding up on rollers 17, 25, 19, 32, 33 and 10 and, respectively, on rollers 18, 26, 20, 40 and 11, on which said tapes ar kept at a stretched condition by rollers 25 and 26 acting as tension rollers. The tapes are caused to slide on their supporting rollers by rollers 10 and 11 which are rotated by motor 8 when the electric current is supplied thereto.

It will be appreciated that the pressure rollers 32, 33 and 40 have a shaped profile (as seen from the enlarged detail in FIG. 3). Pressure rollers 32, 33 and 40 can be readily changed by replacing the plates 31 and 39 on the associated supporting rocking arms, the roller change being required upon substantial changes in the diameter of the wood piece to be smoothed and surface shaping of said wood piece.

As particularly seen in FIG. 1, as the wood piece 5 is rotated about its axis between the lathe spindle and tailstock and as the carriage 2 moves parallel to the turned wood piece, the tapes 43 and 44, the outward facing surface of which is coated with abrasive different grain material, are kept at a pressed condition on the surface of the turned wood piece at the space between the pair of pressure rollers 32 and 33 and the pair of pressure rollers carried by plate 39.

When shaft 9 is rotated by motor 8, the tapes 43 and 44 will fast rotate on the associated supporting rollers and provide for smoothing the turned wood piece and will not deteriorate it at all, since the pressure rollers have been selected in accordance with the size and profile of the wood piece to be smoothed and because the pressure roller movement to or away from the axis of rotation for the wood piece 5 is controlled by template 3, that is the same template which had controlled the movement of the turning tool center to or away from the axis of rotation for the wood piece. Finally, it will be seen that the pressure rollers carried by plates 31 and 39 perform the same movements in the space that the turning tool had to perform for turning the wood piece 5.

One of the two tapes 43 and 44 will have its outer surface coated with an abrasive material of a thicker grain than that of the abrasive material coating the other tape and in such a case one of said two tapes will rough the turned wood piece, while the other tape, the movement of which in a vertical plane is independent of that of the first tape, actually smoothes the wood piece surface. Preferably, on the same carriage 2, on which the base 6 of the above described device is mounted, is also mounted the turret carrying the cutting tools which effect the turning (as controlled by template 3) on the wood piece 5, so that the wood piece smoothing operation is carried out just after and subsequently to the actual turning operation.

As a result, just after being turned the wood piece 5 is also rough-shaped and ready to be used just as removed from the lathe.

It is also important to point out that the device could comprise more than two rocking arms and more than two abrasive tapes independent of and parallel to one another, to this purpose it being sufficient to mount additional rocking arms on shaft 9 and additional supporting and driving rollers for these additional tapes on said rocking arm 13.

What I claim is:

1. A device for smoothing the surface of turned wood pieces and applicable to the carriage of a lathe provided with a copying template, comprising a base attached to the carriage of a lathe, a motor mounted on said base and having an elongated projecting shaft on which at least two rollers are keyed, at least a first and a second arm rocking independently of each other and freely rotably mounted about the axis of said motor shaft, at least a first and a second pair of shaped pressure rollers juxtaposed to each other and freely rotably mounted on pins carried by a first plate secured to the associated rocking arm and, respectively, carried by a second plate secured to said second rocking arm, at least one rod projecting from said first rocking arm and carrying at least two rollers freely rotable on said rod, at least two looped tapes having the outward facing surface thereof coated with abrasive material, one of these tapes being slidably mounted on said pair of pressure rollers carried by said first plate, on one roller of said shaft and one roller of said rod, respectively, and the other tape being also slidably mounted on said pair of pressure rollers carried by said second plate, on the other roller of said shaft and the other roller of said rod, respectively, each of said first and second arms having an extension extending towards said template fast with the lathe frame and abutting on the shaped profile of the template.

2. A device according to claim 1, comprising at least two rollers independent of each other and freely rotable on pins, each of which is carried by a lever which, in turn, is freely rotably mounted on a rod carried by said first rocking arm, there operating on each of said levers a spring urging the rollers carried by said levers against one and respectively the other of said looped tapes.

3. A device according to claim 2, comprising at least a first and a second spring, one end of which is attached to said base and the other end of which is attached to said first and said second rocking arm, respectively, said springs operating on said rocking arms to keep said extensions at an urged condition on the shaped profile of said template.

* * * * *